(12) United States Patent
Huebner et al.

(10) Patent No.: US 11,323,396 B2
(45) Date of Patent: May 3, 2022

(54) SYSTEM AND METHOD FOR SECURE VEHICLE COMMUNICATION

(71) Applicant: Bayerische Motoren Werke Aktiengesellschaft, Munich (DE)

(72) Inventors: Konrad Huebner, Gauting (DE); Reinhard Jurk, Groebenzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 176 days.

(21) Appl. No.: 16/546,494

(22) Filed: Aug. 21, 2019

(65) Prior Publication Data
US 2019/0379746 A1 Dec. 12, 2019

Related U.S. Application Data

(63) Continuation of application No. PCT/EP2018/053566, filed on Feb. 13, 2018.

(30) Foreign Application Priority Data

Mar. 14, 2017 (DE) ..................... 10 2017 204 156.0

(51) Int. Cl.
*H04L 51/046* (2022.01)
*H04W 4/44* (2018.01)
*H04L 67/125* (2022.01)
*H04L 67/146* (2022.01)
*H04W 4/20* (2018.01)
*H04W 12/02* (2009.01)
(Continued)

(52) U.S. Cl.
CPC ........ *H04L 51/046* (2013.01); *H04L 63/0421* (2013.01); *H04L 67/125* (2013.01);
(Continued)

(58) Field of Classification Search
CPC . H04L 51/046; H04L 63/0421; H04L 67/125; H04L 67/146; H04L 67/142;
(Continued)

(56) References Cited

U.S. PATENT DOCUMENTS

2004/0117195 A1* 6/2004 Bodin ................... G06Q 30/08
705/39
2004/0203672 A1 10/2004 Crocker et al.
(Continued)

FOREIGN PATENT DOCUMENTS

DE 10 2008 035 431 A1 3/2009
EP 1 058 220 A1 12/2000

OTHER PUBLICATIONS

International Search Report (PCT/ISA/210) issued in PCT Application No. PCT/EP2018/053566 dated Apr. 23, 2018 with English translation (four (4) pages).
(Continued)

*Primary Examiner* — Mohammad W Reza
(74) *Attorney, Agent, or Firm* — Crowell & Moring LLP

(57) ABSTRACT

A system and method for secure vehicle communication of a vehicle. The system comprises a communication system comprising at least one telematics module for executing one or more telematics applications, and a session module for session management of the telematics applications, wherein the session management comprises the assigning of at least one session identification, session ID, to each telematics application, wherein the session module assigns a new session ID to each telematics application after expiration of a predetermined time period.

8 Claims, 2 Drawing Sheets

(51) Int. Cl.
*H04W 12/062* (2021.01)
*H04L 29/06* (2006.01)

(52) U.S. Cl.
CPC .............. *H04L 67/146* (2013.01); *H04W 4/20* (2013.01); *H04W 4/44* (2018.02); *H04W 12/02* (2013.01); *H04W 12/062* (2021.01)

(58) Field of Classification Search
CPC ....... H04L 67/141; H04L 63/08; H04L 67/12; H04L 12/22; H04W 12/062; H04W 4/44; H04W 4/20; H04W 12/02; H04W 76/11; H04W 76/38
USPC .......................................................... 726/1
See application file for complete search history.

(56) References Cited

U.S. PATENT DOCUMENTS

| | | |
|---|---|---|
| 2005/0085221 A1 | 4/2005 | Sumcad |
| 2007/0208501 A1* | 9/2007 | Downs ............... B60T 7/18 701/119 |
| 2010/0191703 A1* | 7/2010 | Masson ............ G07C 5/008 707/621 |
| 2011/0149872 A1* | 6/2011 | Carroll ............. H04W 4/40 370/328 |
| 2015/0332519 A1* | 11/2015 | Hiura ............... G07B 15/00 701/33.4 |
| 2016/0292929 A1* | 10/2016 | Konks ............... G07C 9/32 |
| 2016/0352712 A1 | 12/2016 | Tamp |
| 2016/0359980 A1* | 12/2016 | Penilla ............ G06Q 30/0643 |

OTHER PUBLICATIONS

German-language Written Opinion (PCT/ISA/237) issued in PCT Application No. PCT/EP2018/053566 dated Apr. 23, 2018 (eight (8) pages).
German-language Office Action issued in counterpart German Application No. 102017204156.0 dated Oct. 6, 2017 (11 pages).

* cited by examiner

SYSTEM AND METHOD FOR SECURE VEHICLE COMMUNICATION

CROSS REFERENCE TO RELATED APPLICATIONS

This application is a continuation of PCT International Application No. PCT/EP2018/053566, filed Feb. 13, 2018, which claims priority under 35 U.S.C. § 119 from German Patent Application No. 10 2017 204 156.0, filed Mar. 14, 2017, the entire disclosures of which are herein expressly incorporated by reference.

BACKGROUND AND SUMMARY OF THE INVENTION

The present invention relates to a system and a method for secure vehicle communication.

The increasing data acquisition, data processing and data communication (or data interchange) for executing telematics applications or telematics services in a vehicle (also called vehicle communication below), which are provided over the Internet via servers as providers of telematics services, hold challenges with regard to information security, in particular with regard to the data protection of at least person-related and/or personal data, that is to say data which enable a direct and/or indirect personal link. Even if a personal link is not always obvious when interchanging data during the execution of telematics applications, specific information relating to the owner or driver of the corresponding vehicle may be obtained for the common and future vehicle communication scenarios. For example, knowledge of the whereabouts of the owner or driver of the vehicle and his driving behavior may be inferred by capturing and forwarding location and movement data. Corresponding movement and/or behavioral profiles can be created from this knowledge. This is particularly critical if the data or the profiles inferred therefrom are made available to third parties.

The object of the invention is to avoid the disadvantages mentioned above and to provide a solution which enables secure vehicle communication.

According to a first aspect of the invention, a system for the secure vehicle communication of a vehicle is provided, comprising:
a communication system comprising:
at least one telematics module for executing one or more telematics applications,
a session module for the session management of the telematics applications,
wherein the session management comprises the assignment of at least one session identification number, session ID, to each telematics application;
wherein the session module assigns a new session ID to each telematics application after expiry of a predetermined period.

The communication system is arranged locally in the vehicle. It comprises at least one telematics module for executing one or more telematics applications assigned to the telematics module.

Telematics applications which are used in the vehicle cover the fields of traffic management, safety services and dynamic navigation aids. For example, the at least one telematics application is
dynamic updating of status information relating to one or more digital maps in the vehicle for providing dynamic navigation aids, for carrying out at least one autonomous driving mode of the vehicle, etc.;
fleet management;
remote diagnosis;
theft prevention;
access to databases outside the vehicle, and/or
transmission of electronic messages, for example email.

The performance or provision of telematics applications in the vehicle requires communication between the communication system, which is arranged in the vehicle and comprises at least one telematics module, and a telematics service provider, for example a server, which provides at least one telematics service via a suitable network, for example the Internet. Communication between the vehicle and the server can take place via the mobile radio network, for example, and can comprise previous authentication by means of suitable specific access data.

The at least one telematics module may comprise, for example, an independent circuit unit or a part of a central computer unit. Additionally or alternatively, the at least one telematics module may comprise a software module which is executed by a suitable computer unit. The at least one telematics module may comprise at least one network connection device and/or may be assigned to at least one network connection device, with the result that the at least one telematics application which is assigned to the telematics module can access the at least one telematics service of the telematics service provider via a suitable network.

A session is an established connection between a client—in this case the vehicle—and a server—in this case the telematics service provider. A session comprises an assignment of a session ID to a multiplicity of connected operations using otherwise stateless protocols (for example HTTP) and can be terminated implicitly by terminating the use of the session ID or explicitly by means of a logout, for example. During the session, a session identification number or session ID is transmitted each time the server is accessed using the otherwise stateless protocols, via which no established connections between the client and server are possible, with the result that the otherwise unrelated access operations by the client are combined to form a connected session.

The communication system in the vehicle comprises a central session module for the session management of the telematics applications which are executed on the at least one telematics module. In this case, the session management comprises the assignment of at least one session identification number (session ID) to each session of a telematics application executed on the at least one telematics module. In this case, a separate session ID can be generated for each telematics application. The session module may comprise, for example, an independent circuit unit or a part of a central computer unit. Additionally or alternatively, the at least one session module may comprise a software module which is executed by a suitable computer unit. The session module can transmit the session ID to the corresponding telematics module. In another example, the session module may comprise a network connection device and/or may be assigned to at least one network connection device, with the result that the telematics module can carry out the session management of the telematics services via a suitable network.

The session management advantageously prevents the telematics service provider from being able to determine a correlation between the corresponding session (via the session ID) and the vehicle by means of the central session module which is located in the vehicle. It is therefore not possible for the telematics service provider to create movement and/or behavioral profiles from the at least one telematics application. This significantly increases the data security of the driver or owner of the vehicle. Within the scope of this description, the term "data security" should be understood as meaning, in particular, the protection of the privacy of the driver or owner of the vehicle. In particular, this protection of the privacy comprises preventing a personal link from being indirectly and/or directly possible from the technical status data from the vehicle or from further technical data needed to provide the one or more telematics applications. This advantageously prevents these technical data from having a personal link or comprising a personal reference, as a result of which the vehicle communication security with respect to the direct and indirect data protection is increased and secure vehicle communication is enabled.

For example, during each journey, the session module may have read access to the storage module and may change the session ID after a predefinable session period stored in the storage module (see above). This can be carried out, for example, by virtue of the session module assigning a new session ID after this session period for the purpose of providing the at least one telematics application in the vehicle. Changing the session ID implicitly terminates the session since there is no longer any reference to the previous actions.

The ability to assign data to a particular session is thus advantageously made more difficult since it is no longer possible to assign data to a particular journey or journey duration, thus further increasing the data security.

In addition, the fact that the telematics application can be interrupted before any change in the session ID during the journey for a suitable predetermined period, which can be either permanently defined or dynamically selected in a random manner, can be stored in the storage module (by the session module and/or ex-works). The session module can carry out this interruption after it has had read access to the storage module, for example. This further increases the data security since no direct temporal relationship between the old session ID and the new session ID for the telematics application is possible and the personal reference is therefore made more difficult.

The system preferably also comprises a storage module, wherein the session module stores a correlation of all session IDs to the vehicle locally in the storage module.

For example, the vehicle may contain a storage module, to which the session module has at least write access and can store a correlation of each session ID to the vehicle and possibly a predefinable or predefined session period for the at least one telematics application, wherein a separate session period can be stored for each telematics application. For example, the fact that each session (of a telematics application) is terminated after an appropriate period, for example after 1 minute, after 2 minutes, after 5 minutes or after any other appropriate period, can be stored as the predefined session period. The predefined session period may also respectively be randomly selected periods which are dynamically generated by a random number generator, for example. Alternatively, the session period(s) can be stored in the storage module ex-works.

The data advantageously remain locally stored in the vehicle, with the result that the driver or owner of the vehicle can access the data if desired and can initiate an analysis of the data.

The correlation of the session IDs to the vehicle in the storage module is preferably periodically overwritten.

For example, it is possible to specify that the correlation of each session ID to the vehicle remains stored in the storage module for a predetermined period for possible data evaluations and is overwritten in the storage module after expiry of the predetermined period. For example, the predetermined period may comprise a day, a week, a month or any other suitable period. The storage requirement for storing the correlation of the session IDs to the vehicle in the storage module is therefore advantageously minimized.

The system preferably also comprises a control module, wherein the control module accesses the correlation of the session IDs to the vehicle from the storage module in the case of a predeterminable event and transmits said correlation to a corresponding telematics service provider and/or a trusted backend server.

For example, the predeterminable event may be a fault which occurs during a telematics service. In this case, the correlation of the corresponding session ID(s) to the vehicle can be automatically read from the storage module via a control module in the vehicle and can be transmitted, for fault diagnosis, to the corresponding telematics service provider and/or to a trusted backend server. In this case, provision may be made for consent of the driver or owner of the vehicle to be requested via the input and output unit of the vehicle before each operation of reading data by the control module and/or before each operation of transmitting the data to a telematics service provider and/or to the backend server.

The predefined event preferably comprises a request to transmit the correlation of the session IDs to the vehicle via an input and output unit of the vehicle.

For example, if a fault occurs during a telematics service, the driver can be provided with a fault message via an input and output unit (for example on-board computer) in the vehicle. In another example, the driver of the vehicle can himself detect incorrect execution of a telematics service. In this case, the driver can initiate the transmission of the correlation of the corresponding session ID(s) to the vehicle by means of a suitable input via the input and output unit. The suitable input can be used to initiate the control module to read the corresponding session ID(s) from the storage module and to transmit it/them, for fault diagnosis, to the corresponding telematics service provider and/or to a trusted backend server.

The driver or owner of the vehicle can also be provided with the opportunity to delete all data from the data module, for example via the input and output unit of the vehicle.

It can therefore be advantageously ensured that the data stored in the storage module can be transmitted to the corresponding telematics service provider and/or a trusted backend server for fault diagnosis in response to initiation by the driver or owner of the vehicle. The diagnostic capability as a result of the data is therefore ensured despite the increased data security.

According to a second aspect of the present invention, the underlying object is achieved by a method for the secure vehicle communication of a vehicle, comprising:

executing one or more telematics applications via at least one telematics module; and carrying out session management of the telematics applications via a session module in the vehicle, wherein the session management comprises the assignment of at least one session identification number, session ID, to each telematics application, wherein the session module assigns a new session ID to each telematics application after expiry of a predetermined period.

The method preferably also comprises:
storing a correlation of all session IDs to the vehicle in a local storage module,
wherein the correlation of the session IDs to the vehicle in the storage module is periodically overwritten.

The method preferably also comprises:
transmitting the correlation of the session IDs to the vehicle to a corresponding telematics service provider and/or a trusted backend server in the case of a predeterminable event;
wherein the predeterminable event comprises a request to transmit the correlation of the session IDs to the vehicle via an input and output unit of the vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
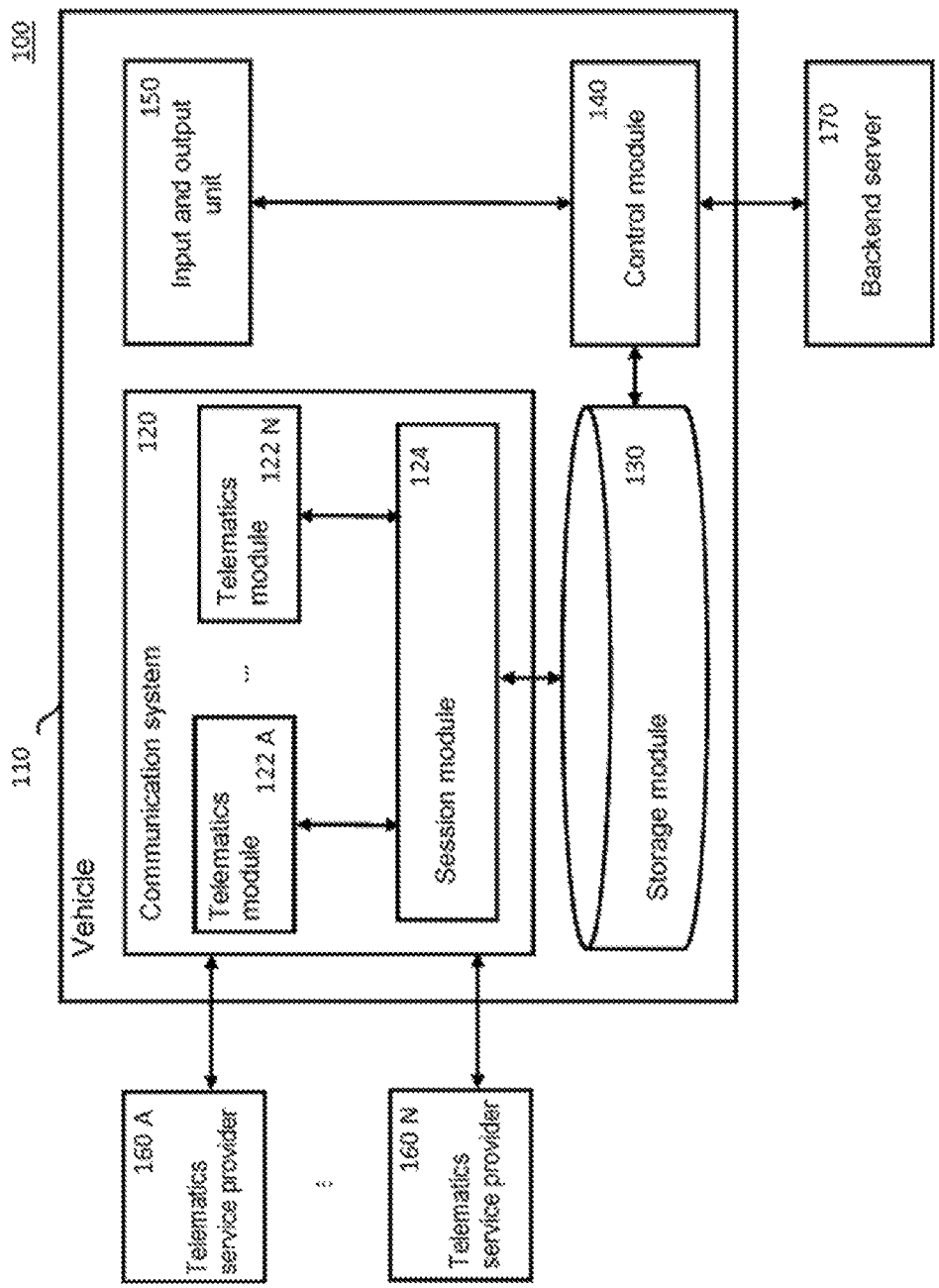
FIG. 1 is a block diagram of an exemplary system for the secure vehicle communication of a vehicle.

FIG. 1 shows an exemplary system 100 for the secure vehicle communication of a vehicle 110. The vehicle comprises a communication system 120. The communication system 120 comprises at least one telematics module 122A . . . 122N for executing one or more telematics applications assigned to the telematics module 122A . . . 122N.

Telematics applications which are used in the vehicle cover the fields of traffic management, safety services and dynamic navigation aids. For example, the at least one telematics application is dynamic updating of status information relating to one or more digital maps in the vehicle for providing dynamic navigation aids, for carrying out at least one autonomous driving mode of the vehicle;
fleet management;
remote diagnosis;
theft prevention;
access to databases outside the vehicle, and/or
transmission of electronic messages, for example email.

The performance or provision of telematics applications in the vehicle 110 requires communication between the communication system 120, which is arranged in the vehicle 110 and comprises at least one telematics module 122A . . . 122N, and at least one telematics service provider 160A . . . 160N, for example a server, which provides at least one telematics service via the Internet. Communication between the vehicle (client) 110 and the server 160A . . . 160N can take place via a mobile radio network, for example, and can comprise previous authentication by means of suitable specific access data.

The at least one telematics module 122A . . . 122N may comprise, for example, an independent circuit unit or a part of a central computer unit. Additionally or alternatively, the at least one telematics module may comprise a software module which is executed by a suitable computer unit. The at least one telematics module may comprise at least one network connection device and/or may be assigned to at least one network connection device, with the result that the at least one telematics application which is assigned to the telematic s module can access the at least one telematics service of the telematics service provider via a suitable network.

The communication system 120 in the vehicle comprises a central session module 124 for the session management of the telematics applications which are executed on the at least one telematics module 122A . . . 122N. In this case, the session management comprises the assignment of at least one session identification number (session ID) to each telematics application executed on the at least one telematics module 122A . . . 122N. In this case, a separate session ID can be generated and/or assigned for each telematics application. The session module 124 may comprise, for example, an independent circuit unit or a part of a central computer unit. Additionally or alternatively, the session module 124 may comprise a software module which is executed by a suitable computer unit. The session module 124 can transmit the session ID to the corresponding telematics module 122A . . . 122N. In another example, the session module 124 may comprise a network connection device and/or may be assigned to at least one network connection device, with the result that the telematics module 124 can carry out the session management of the telematics services via a suitable network. The session module can change the session ID for a telematics application 160A . . . 160N during a session. For example, the session ID can be changed during each session after a randomly selected period in each case. The ability to assign possibly personal data to a particular session is therefore advantageously made more difficult and the data security is therefore increased further.

As a result of the session management via the central session module 124 in the vehicle 110, it is not possible for the telematics service providers 160A . . . 160N to establish or determine a correlation between the corresponding session and the vehicle 110. As a result, it is not possible for the telematics service providers 160A . . . 160N to create movement and/or behavioral profiles from the at least one telematics application. This significantly increases the data security with respect to data relating to the driver or owner of the vehicle 110.

The system 100 may also comprise a storage module 130 which is also locally arranged in the vehicle 110. The session module 124 may have at least write access to the storage module 130 and can store a correlation of all session IDs to the vehicle 110 locally in the storage module 130. The storage module may be part of the communication system 120 or may be at least logically separate from the communication system 120.

In addition, a predefinable or predefined session period for each telematics application may be stored in the storage module 130 (by the session module 124 and/or ex-works). In this example, the session module 124 may also have read access to the storage module 130. For example, the fact that each session is terminated after an appropriate period, for example after 1 minute, after 2 minutes, after 5 minutes or after any other appropriate period, can be stored as the predefined session period. The predefined session period may also respectively be randomly selected periods which are dynamically generated by a random number generator, for example. In this case, a separate predefined session period may also be stored for each telematics application. The session module 124 can change the session ID for each telematics application during a journey. For example, the session ID may be changed during each journey after one (or more) predefinable session period (session periods) stored in the storage module 130. This can be carried out, for example, by virtue of the session module 124 assigning a new session ID to the respective telematics application for the purpose of providing the at least one telematics application in the vehicle after reading the respective session period from the storage module 130. The session is implicitly terminated by changing or newly assigning the session ID since there is no longer any reference to the previous actions. The ability to assign data to a particular session, and therefore also the personal reference of the data, is thus advantageously made more difficult since it is no longer possible to assign data to a particular journey or journey duration, thus further increasing the data security.

In addition, the fact that the session module 124 can interrupt the respective telematics application before any change in the session ID of the respective telematics application during the journey for a suitable predetermined period, which can be either permanently defined or dynamically selected in a random manner, can be stored in the storage module 130 (by the session module and/or ex-works). This further increases the data security since no direct temporal relationship between the "old" session ID and the "new" session ID for the telematics application is possible and the personal reference of the data is therefore made more difficult.

The data thus advantageously remain locally stored in the vehicle 110, with the result that the driver or owner of the vehicle 110 has access to the data stored in the storage module 130 if desired, in which case access to these data by third parties, in particular by the telematics service providers 160A . . . 160N, is simultaneously prevented.

The correlation of the session IDs to the vehicle 110 in the storage module 130 can be periodically overwritten. For example, it is possible to specify that the correlation of each session ID to the vehicle 110 remains stored in the storage module 130 for possible data evaluations for a predetermined or predeterminable period and is overwritten in the storage module 130 after expiry of the predetermined period. For example, the predetermined period may comprise a day, a week, a month or any other suitable period. The storage requirement for storing the correlation of the session IDs to the vehicle 110 in the storage module 130 is therefore advantageously minimized.

The system 100, and the vehicle 110 in particular, can also comprise a control module 140. The control module 140 may comprise, for example, an independent circuit unit or a part of a central computer unit. Additionally or alternatively, the control module 140 may comprise a software module which is executed by a suitable computer unit. The control module 140 may be set up to access the correlations of the session IDs to the vehicle 110, which are stored in the storage module 130, in the case of a predeterminable or predetermined event and to transmit said correlations to the corresponding telematic s service provider 160A . . . 160N. For example, the predetermined event may be a fault which occurs while providing a telematics service. In this case, the correlation of the corresponding session ID(s) to the vehicle 110 can be automatically read from the storage module 130 via the control module 140 in the vehicle 110 and can be transmitted, for fault diagnosis, to the corresponding telematics service provider 160A . . . 160N and/or to a trusted backend server 170. In this case, provision may be made for consent of the driver or owner of the vehicle 110 to be requested via the input and output unit 150 of the vehicle 110 before each operation of reading data by the control module 140 and/or before each operation of transmitting the data to a telematics service provider 160A . . . 160N and/or to the backend server 170.

The predefined or predefinable event may comprise a request to transmit the correlation of the session IDs to the vehicle 110 via an input and output unit 150 of the vehicle 110.

For example, if a fault occurs during a telematics service, a fault message can be output to the driver via an input and output unit (for example on-board computer) 150 in the vehicle 110. In another example, the driver of the vehicle 110 can himself detect incorrect execution of a telematics service.

The driver or owner of the vehicle 110 can initiate the transmission of the correlation of the session ID(s) to the vehicle, which are assigned to the corresponding session of the telematics service, by means of a suitable input via the input and output unit 150. The input and output unit 150 can initiate the control module 140 to read the corresponding session ID(s) from the storage module 130 and to transmit it/them, for fault diagnosis, to the corresponding telematics service provider 160A . . . 160N and/or to a trusted backend server 170.

The driver or owner of the vehicle 110 can also be provided with the opportunity to delete all data from the data module 130, for example via the input and output unit 150 of the vehicle 110.

It can therefore be advantageously ensured that the data stored in the storage module 130 can be transmitted to the corresponding telematics service provider 160A . . . 160N and/or a trusted backend server 170 for fault diagnosis in response to initiation by the driver or owner of the vehicle 110. The diagnostic capability as a result of receiving the correlation in the storage module 130 is therefore ensured despite the increased data security.

Figure 2:
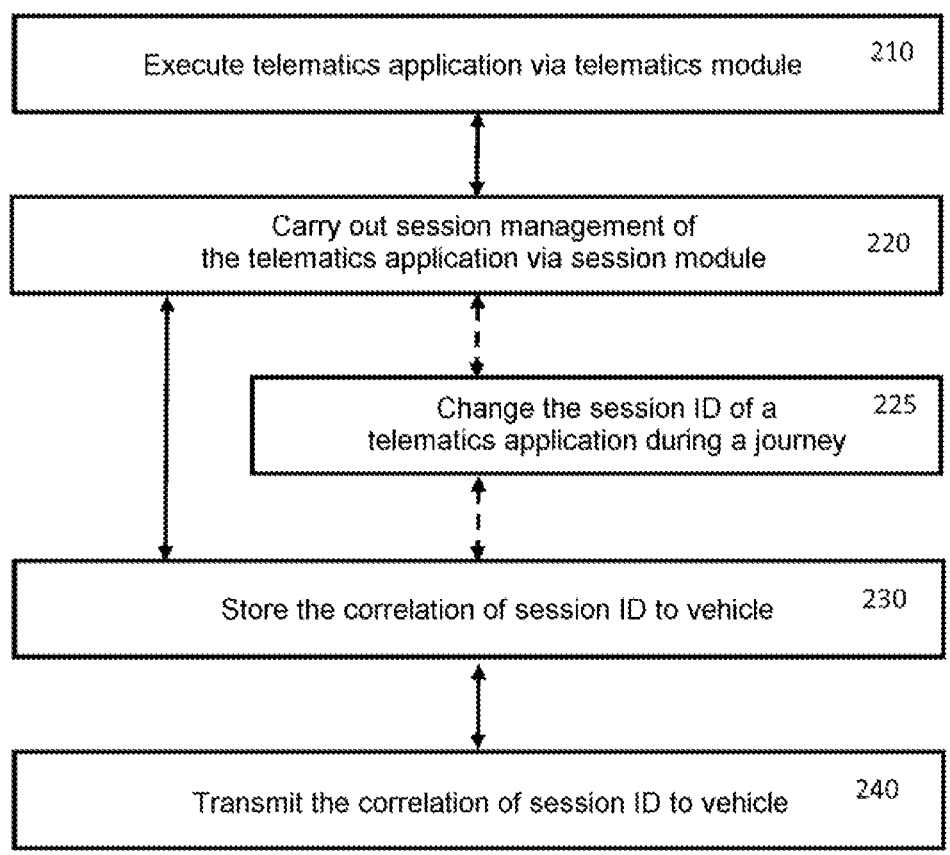
FIG. 2 is a flowchart of an exemplary method for secure vehicle communication.

FIG. 2 shows an exemplary method 200 for the secure vehicle communication of a vehicle 110, which method can be carried out by a system 100 as described with reference to FIG. 1.

The method 200 comprises:

executing 210 one or more telematics applications via at least one telematics module 122A . . . 122N; and carrying out 220 session management of the telematics applications via a session module 124 in the vehicle, wherein the session management comprises the assignment of at least one session identification number, session ID, to each telematics application. In this case, the session ID for a telematics application can be changed 225 during a journey.

The method 200 may also comprise:

storing 230 a correlation of all session IDs to the vehicle 110 in a local storage module 130, wherein the correlation of the session IDs to the vehicle 110 in the storage module 130 can be periodically overwritten; and transmitting 240 the correlation of the session IDs to the vehicle 110 to the corresponding telematics service provider 160A . . . 160N and/or a trusted backend server 170 in the case of a predeterminable event;

wherein the predeterminable event comprises a request to transmit the correlation of the session IDs to the vehicle 110 via an input and output unit 150 of the vehicle 110.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for secure vehicle communication of a vehicle, the system comprising:
   a communication system comprising:
   at least one telematics module for executing one or more telematics applications, and
   a session module for session management of the telematics applications, wherein the session management comprises an assignment of at least one session ID to each telematics application;
   wherein the session module assigns a new session ID to each telematics application after expiry of a predetermined period that is dynamically selected in a random manner.

2. The system according to claim 1, further comprising:
   a storage module;
   wherein the session module stores a correlation of all session IDs to the vehicle locally in the storage module.

3. The system according to claim 2, wherein
   the correlation of the session IDs to the vehicle in the storage module is periodically overwritten.

4. The system according to claim 2, further comprising:
   a control module, wherein the control module reads the correlation of the session IDs to the vehicle from the storage module in the case of a predeterminable event and transmits said correlation to a corresponding telematics service provider and/or a trusted backend server.

5. The system according to claim 4, wherein
   the predefinable event comprises a request to transmit the correlation of the session IDs to the vehicle via an input and output unit of the vehicle.

6. A method for secure vehicle communication of a vehicle, the method comprising:
   executing one or more telematics applications via at least one telematics module; and
   carrying out session management of the telematics applications via a session module in the vehicle, wherein
   the session management comprises an assignment of at least one session ID to each telematics application, and
   the session module assigns a new session ID to each telematics application after expiry of a predetermined period that is dynamically selected in a random manner.

7. The method according to claim 6, further comprising:
   storing a correlation of all session IDs to the vehicle in a local storage module,
   wherein the correlation of the session IDs to the vehicle in the storage module is periodically overwritten.

8. The method according to claim 7, further comprising:
   transmitting the correlation of the session IDs to the vehicle to a corresponding telematics service provider and/or a trusted backend server in the case of a predeterminable event;
   wherein the predeterminable event comprises a request to transmit the correlation of the session IDs to the vehicle via an input and output unit of the vehicle.

* * * * *